United States Patent
Richardson

(10) Patent No.: US 7,571,719 B2
(45) Date of Patent: *Aug. 11, 2009

(54) HYDROGEN AUGMENTED DIESEL CRANKCASE VENTILATION

(76) Inventor: James Richardson, 26156 Balboa Ct., P.O. Box 1242, Helendale, CA (US) 92321

(*) Notice: Subject to any disclaimer, the term of this patent is extended or adjusted under 35 U.S.C. 154(b) by 27 days.

This patent is subject to a terminal disclaimer.

(21) Appl. No.: 11/781,826

(22) Filed: Jul. 23, 2007

(65) Prior Publication Data

US 2008/0011249 A1  Jan. 17, 2008

Related U.S. Application Data

(63) Continuation-in-part of application No. 11/330,466, filed on Jan. 12, 2006, now Pat. No. 7,249,598.

(51) Int. Cl.
F02B 43/08 (2006.01)
F02M 26/06 (2006.01)

(52) U.S. Cl. ............ 123/572; 123/3; 123/DIG. 12

(58) Field of Classification Search .......... 123/572–574, 123/41.86, 3, DIG. 12
See application file for complete search history.

(56) References Cited

U.S. PATENT DOCUMENTS

| | | | |
|---|---|---|---|
| 2,291,283 A * | 7/1942 | Klein et al. ............ 236/35.3 |
| 3,101,592 A * | 8/1963 | Robertson et al. ........ 60/39.463 |
| 3,744,602 A * | 7/1973 | Ajwani ................. 477/182 |
| 3,844,262 A * | 10/1974 | Dieges ................. 123/567 |
| 4,068,628 A * | 1/1978 | Duckworth ............. 123/58.8 |
| 4,111,160 A | 9/1978 | Talenti |
| 4,136,650 A * | 1/1979 | Manookian, Jr. ......... 123/573 |
| 4,573,435 A | 3/1986 | Shelton |
| 5,272,871 A | 12/1993 | Oshima et al. |
| 5,343,699 A | 9/1994 | McAlister |
| 5,927,075 A | 7/1999 | Khair |
| 6,152,120 A * | 11/2000 | Julazadeh ............. 123/572 |
| 6,155,212 A | 12/2000 | McAlister |
| 6,161,529 A * | 12/2000 | Burgess .............. 123/572 |
| 6,332,434 B1 * | 12/2001 | De Souza et al. ......... 123/3 |
| 6,606,982 B1 * | 8/2003 | Stockhausen et al. ...... 123/572 |
| 6,901,889 B1 | 6/2005 | Ritter et al. |
| 6,915,869 B2 | 7/2005 | Botti et al. |
| 7,249,598 B1 * | 7/2007 | Richardson ............ 123/572 |
| 2005/0258049 A1 | 11/2005 | Klein |

* cited by examiner

*Primary Examiner*—M. McMahon
(74) *Attorney, Agent, or Firm*—Kenneth L. Green; Edgar W. Averill, Jr.

(57) ABSTRACT

A hydrogen augmented diesel crankcase ventilation system uses hydrogen to allow crankcase fumes, for example blowby, to be burned by the engine. The system preferably includes a hydrogen generation system as a hydrogen source connected to an engine air intake by a hydrogen hose, a fumes hose connecting the crankcase to the air intake, and a clean air hose connecting a clean air source to the crankcase. An orifice or a vacuum regulator in cooperation with the fumes hose may be included to regulate crankcase vacuum. A filter resides inline with the fumes hose to capture solids or liquids which enter the fumes hose from the crankcase, and a drain hose drains captured liquid back into the engine. A back flow preventor may be included in cooperation with the clean air hose to prevent a back flow of crankcase fumes through the clean air hose.

19 Claims, 6 Drawing Sheets

HYDROGEN AUGMENTED DIESEL CRANKCASE VENTILATION

The present application is a Continuation in Part of U.S. patent application Ser. No. 11/330,466 filed Jan. 12, 2006, which application is incorporated in it's entirety herein by reference.

BACKGROUND OF THE INVENTION

The present invention relates to reducing emissions from diesel engines and in particular mixing hydrogen with crankcase fumes to facilitate combustion.

Diesel engines are commonly used in commercial applications such as trucks and stationary engines. These engines typically have much higher compression ratios than gasoline engines, and as a result, a substantial amount of diesel blow-by escapes past the piston rings. Unlike gasoline engines which use a simple crankcase ventilation, the diesel blow-by is generally vented to the outside, and presents a source of unpleasant fumes. The diesel engines typically can not simply vent the crankcase to the engine intake, because the diesel blow-by includes components which will degrade the diesel engine operation.

U.S. patent application Ser. No. 11/330,466 for "HYDROGEN AUGMENTED DIESEL CRANKCASE VENTILATION," the parent of the present application, discloses a system combining hydrogen and crankcase fumes in the intake of a diesel engine, whereby the hydrogen facilitates burning the crankcase fumes to reduce emissions and to improve mileage. The system of the '466 application includes a filter 36 in the line carrying the crankcase fumes to the engine intake. In some cases, liquids included in the crankcase fumes have filled the filter and prevented optimal operation of the system. Further, many diesel engines draw air from the intake manifold which is pumped into a tank and used to actuate, for example, air brakes. Drawing hydrogen into such a system may result in undesirable conditions.

BRIEF SUMMARY OF THE INVENTION

The present invention addresses the above and other needs by providing a hydrogen augmented diesel crankcase ventilation system which uses hydrogen to allow crankcase fumes, for example blow-by and/or fumes resulting from the breakdown of engine oil, to be burned in the engine. The system preferably includes a hydrogen generation system as a hydrogen source connected to an engine air intake by a hydrogen hose, a fumes hose connecting the crankcase to the air intake, and a clean air hose connecting a clean air source to the crankcase. An orifice or a vacuum regulator in cooperation with the fumes hose may be included to regulate crankcase vacuum. A filter resides inline with the fumes hose to capture solids or liquids which enter the fumes hose from the crankcase, and a drain hose drains captured liquid back into the engine. A back flow preventor may be included in cooperation with the clean air hose to prevent back flow of crankcase fumes through the clean air hose.

In accordance with one aspect of the invention, there is provided a hydrogen augmented diesel crankcase ventilation system. The system includes a hydrogen generator, a hydrogen hose connecting the hydrogen generator to an engine air intake, a fumes hose connecting an engine crankcase to the engine air intake, and a clean air hose connecting a clean air source to the engine crankcase. The engine air intake preferably resides between an air cleaner and a supercharger, and more preferably a turbo charger. The hydrogen hose carries hydrogen gas and oxygen gas generated in the hydrogen generator to the air intake. A regulator or an orifice cooperates with the fumes hose to regulate a flow through the fumes hose and/or to regulate crankcase vacuum. A filter resides inline with the fumes hose to capture solids or liquids which enter the fumes hose from the crankcase, and a drain hose drains captured liquid back into the engine. A back flow preventor cooperating with the clean air hose to prevent a back flow of crankcase fumes through the clean air hose.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
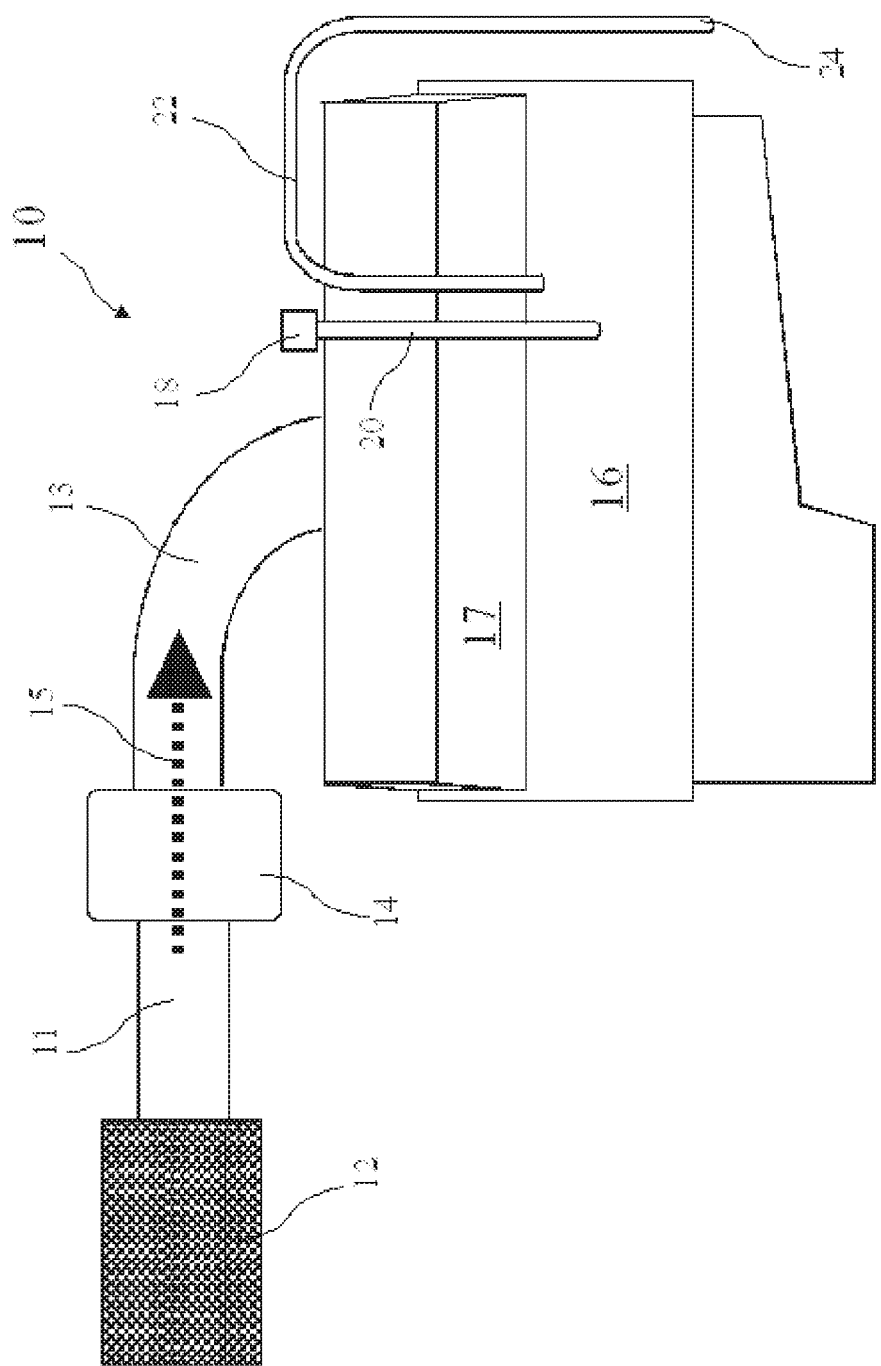
FIG. 1 is a prior art diesel engine.

A typical known diesel cycle engine 10 is shown in FIG. 1. Diesel cycle engines generally use common diesel fuel, but may use other fuels, for example, bio diesel fuel, or the like. The diesel engine 10 includes an engine block 16 which encloses a crankcase. One or two cylinder heads 17 are attached to the block 16 and generally contain valves and intake and exhaust ports. An air flow 15 used in the combustion process enters the diesel cycle engine 10 through an air cleaner 12, passing through an air intake 11 and a super charger 14, which supercharger 14 is preferably a turbo supercharger (or turbo charger), and through an intake manifold 13 (which may include any ducting between the supercharger 14 and the engine) and into the engine 10. The diesel cycle engine 10 further includes an oil fill cap 18 on an oil fill tube 20 for adding motor oil to the diesel cycle engine 10. The diesel cycle engine 10 also includes a crankcase breather 22 with an open end 24 for venting the crankcase and allowing diesel blow-by and the like to escape the crankcase.

Figure 2:
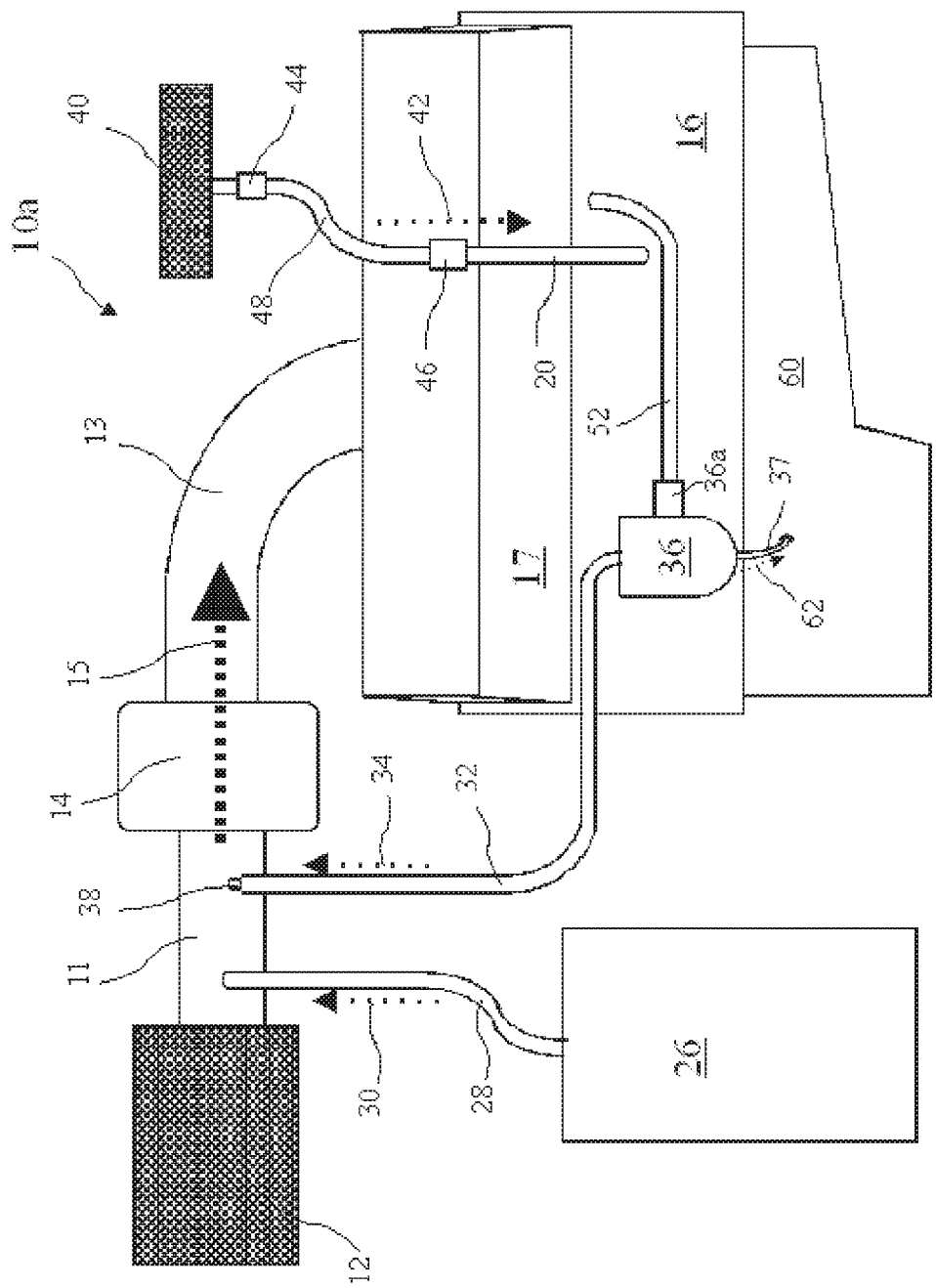
FIG. 2 is an improved diesel engine including a hydrogen augmented diesel crankcase ventilation system according to the present invention.

An improved diesel cycle engine 10a with a hydrogen augmented diesel crankcase ventilation system according to the present invention is shown in FIG. 2. The diesel cycle engine 10a includes a hydrogen source 26 which is preferably a hydrogen generator. Examples of suitable hydrogen generators are well known and described in US Patent Application Publication No. 2005/0258049 for "Hydrogen Generator For Use in a Vehicle Fuel System," U.S. Pat. No. 4,573,435 for "Method and Apparatus for Generating Hydrogen Gas for Use As a Fuel Additive on a Diesel Engine," U.S. Pat. No. 6,155,212 for "Method and Apparatus for Operation of Combustion Engines," and U.S. Pat. No. 6,901,889 for "Fumigation System for a Diesel Engine". The '049 application and the '435, '212, and '889 patents are herein incorporated by reference. An example of a suitable hydrogen generator is a Hydrogen Fuel Injection™ (HFI) system built by Canadian Hydrogen Energy Company Ltd, in Ontario, Canada.

The hydrogen source 26 is connected to the air intake 11 by a hydrogen hose 28. A hydrogen flow 30 including hydrogen gas is carried by the hydrogen hose 28 from the hydrogen source 26 to the air intake 11. The hydrogen flow 30 may consist essentially of hydrogen gas produced by a hydrogen generator from water, or consist essentially of a combination of both hydrogen gas and oxygen gas produced by the hydrogen generator from water. In another embodiment, a separate oxygen hose may carry the oxygen gas to the air intake 11 or to the intake manifold 13.

The breather 22 (see FIG. 1) is replaced by a breather hose 52, filter 36, and fumes hose 32 connecting the crankcase to the air intake 11. The filter 36 is connected in-line with the fumes hose 32, wherein the filter 36 may be at either end of the fumes hose 36, or reside along the fumes hose 36. The hose 52 preferably connects to the block 16 where the breather 22 (see FIG. 1) would otherwise connect and the filter 36 catches any solids or liquids which enter the hose 52. The filter 36 may further include a clear body to allow observation of any solids or liquids collected by the filter 36, and may further include a back flow preventor 36a, for example, residing where the hose 52 is attached to the filter 36. The filter 36 preferably collects liquid in the fumes flow 34 and returns the liquid to the crankcase (or oil pan) as a liquid flow 62 through a drain line 37. The drain line 37 may connect to the oil fill tube 20 or be independently plumbed into the engine block 16 or the oil pan 60 depending on the relative heights of the filter 36 and lowest point of the oil fill tube 20.

The air intake 11 may provide the air flow 15 to the diesel cycle engine through a supercharger 14, or directly to the intake manifold 13 or to the diesel cycle engine 10a. A supercharge generally provides greater vacuum in the fumes hose 32, but in many cases, the intake manifold vacuum in a normally aspirated (i.e., non-supercharged) engine is sufficient. Preferably, the supercharger 14 is a turbo supercharger (or turbo charger). Further, the engine may include two or more superchargers, one or more of which may be turbo superchargers.

The hoses 52 and 32 carry the fumes flow 34 comprising blow-by and other crankcase fumes (e.g., fumes generated by the breakdown of engine oil) and material which previously was vented to the atmosphere through the breather 22 (see FIG. 1). The hose 28 and hose 32 are preferably connected to the air intake 32 at spaced apart points.

A restriction 38 restricts the fumes flow 34, which restriction 38 preferably cooperates with the hose 32 or the hose 52, and more preferably resides proximal to the connection point of the hose 32 to the air intake 11. The restriction 38 regulates (or limits) the fumes flow 34 into the air intake 11. The restriction 38 may be manually adjustable or may be self adjusting, for example, like a pressure or vacuum regulator, or may, for example, be a fixed size replaceable orifice, a variable orifice, or a clamp to squeeze the outside of the hose 32 or the hose 52 to restrict the fumes flow 34. The restriction 38 may be used to adjust crankcase vacuum and preferably results in between approximately one pound and approximately four pounds of crankcase vacuum, and more preferably results in approximately two pounds of crankcase vacuum. In general, a larger engine will operate with a higher crankcase vacuum, and a small engine will operate with a lower crankcase vacuum. The restriction 38 may further cooperate with a vacuum regulator in the clean air hose 48 to regulate crankcase vacuum.

A second air filter 40 may for convenience be connected to the oil fill tube 20 by a clean air hose 48 and a coupling 46 to provide clean air to the crankcase, but may be connected to the crankcase through any appropriate passage. The air filter 40 allows a clean air flow 42 of clean air to enter the crankcase to support a flow through the crank case and into the hose 32, and/or to help cool the crankcase. A back flow preventor 44 may reside inline in the clean air hose 48 to prevent blow-by or other fumes, liquids, or solids from escaping the diesel cycle engine 10a through the air filter 40. The back flow preventor 44 may further include a vacuum regulator to regulate the crankcase vacuum. The crankcase vacuum is preferably regulated to be between approximately one and approximately four pounds.

In some instances, fluids may accumulate in the filter 36 at a high rate. Such high rate may fill the filter 36 during a single trip, and may reduce the performance of the present invention. In these applications, a filter drain line 37 may be included to carry fluids trapped by the filter 36 to the oil pan 60. The filter drain line 37 may attach at a dedicated attachment point, or connect to the filler tube 20, or any tube running to the oil pan or to the crankcase allowing a gravity flow from the filter 36.

While hoses 28, 32, 37, 48, and 52 are referenced above, metal or plastic tubing may be used as well, or any suitable conduit, may be used to carry the flows 30, 34, 37, and 42. Also, the hose 52 and the hose 48 may connect with the crankcase at any suitable point using any suitable connection, and are not limited to connecting through existing connection points.

Figure 3:
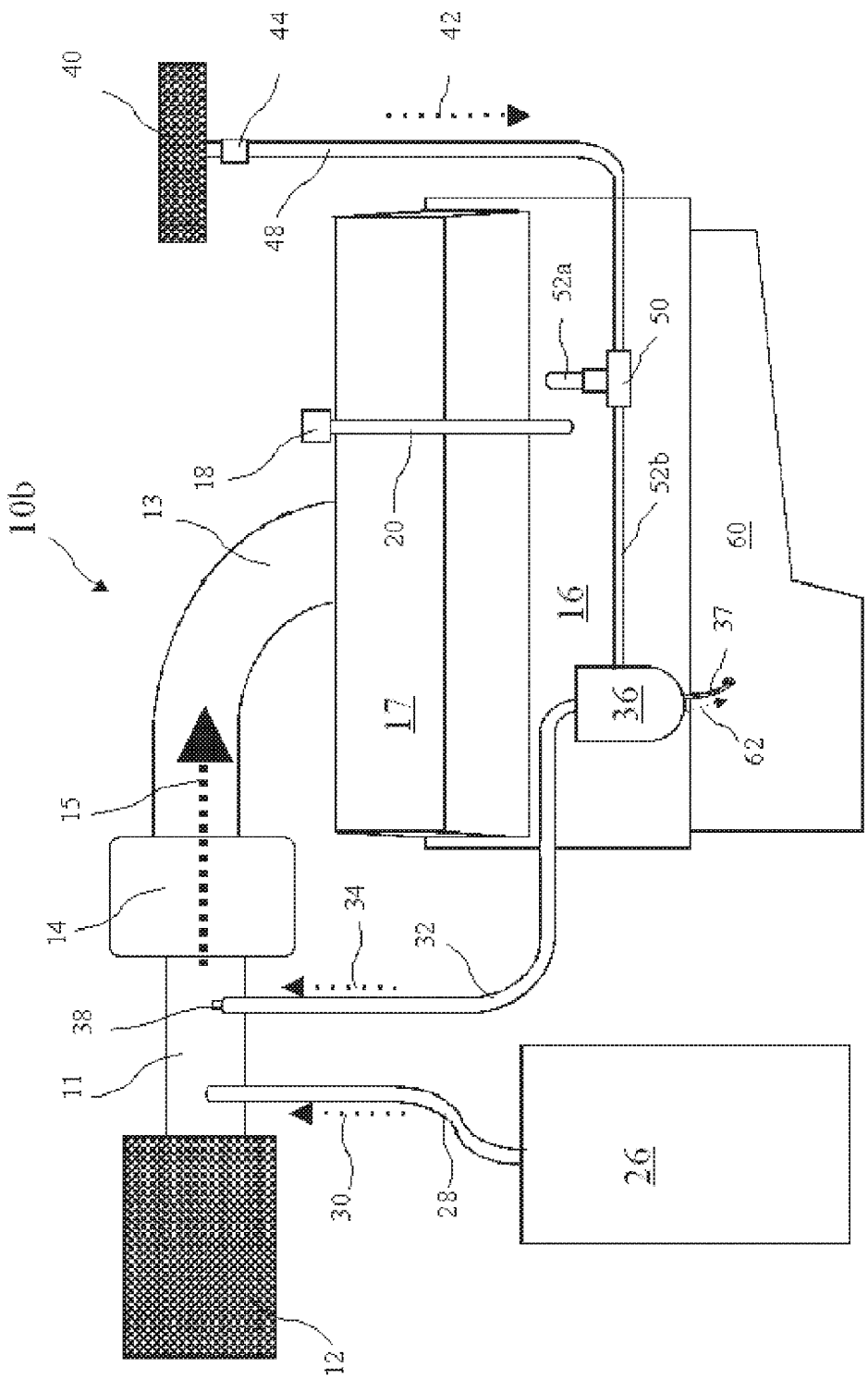
FIG. 3 is a second embodiment of an improved diesel engine including a hydrogen augmented diesel crankcase ventilation system according to the present invention.

A second embodiment of an improved diesel engine 10b including a hydrogen augmented diesel crankcase ventilation system according to the present invention is shown in FIG. 3. The improved diesel engine 10b includes a "T" 50 connecting a first breather hose 52a to a second breather hose 52b and to the clean air hose 48. The improved diesel engine 10b is otherwise similar to the improved diesel engine 10a.

Figure 4:
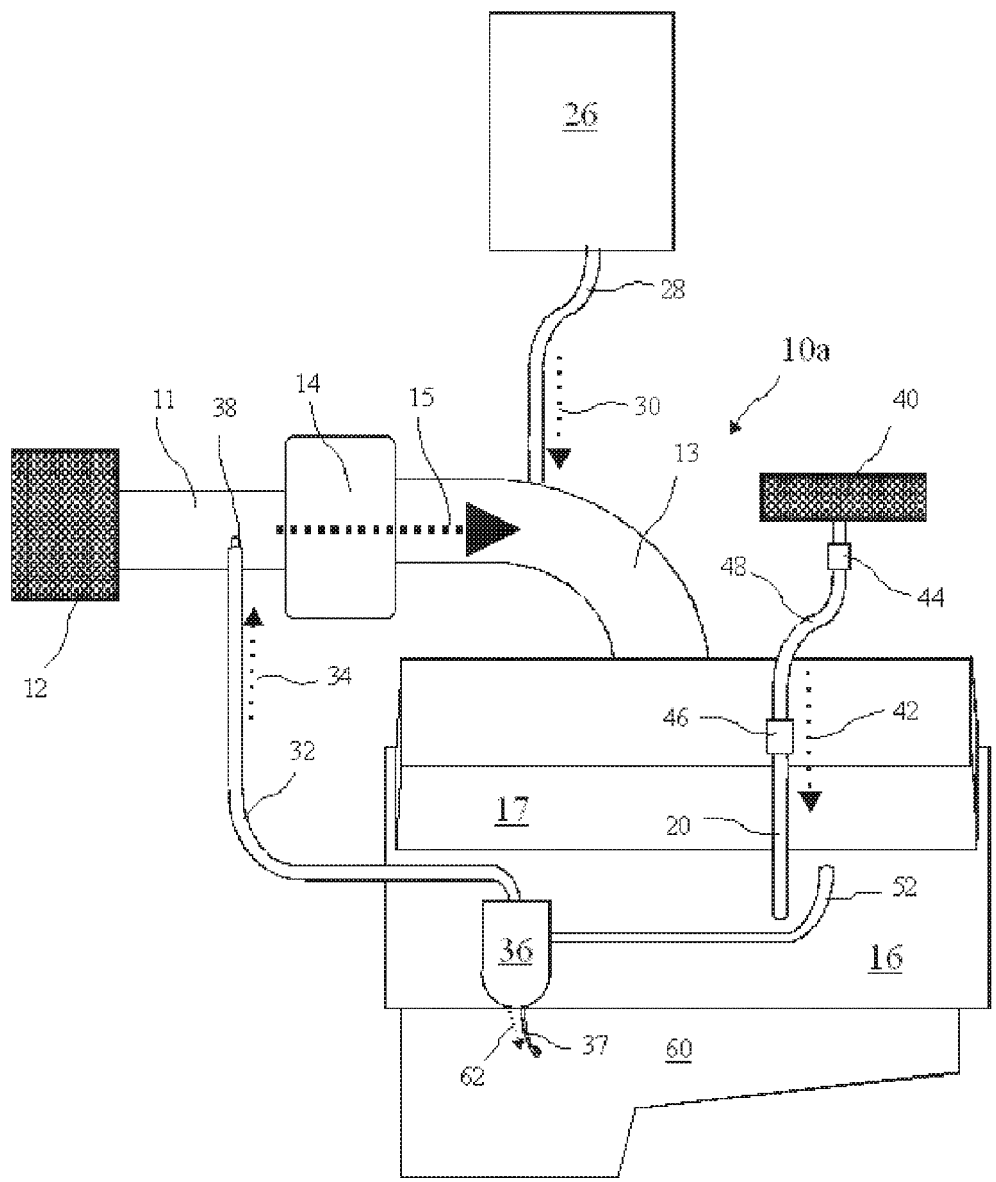
FIG. 4 is a third embodiment of an improved diesel engine including a hydrogen augmented diesel crankcase ventilation system according to the present invention with hydrogen added between a supercharger and the engine.

A third embodiment of an improved diesel engine 10c including the hydrogen augmented diesel crankcase ventilation system according to the present invention with the hydrogen flow 30 introduced between the supercharger 14 and the engine is shown in FIG. 4. In some instances, depending on operating parameters of a particular engine 10, better performance may be obtained by connecting the hydrogen tube 28 to the intake manifold 13 after the supercharger 14. The improved diesel engine 10c is otherwise similar to the improved diesel engine 10a.

Figure 6C:
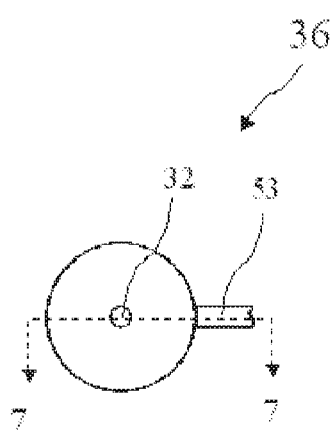
FIG. 6C is a top view of the filter.
Figure 7:
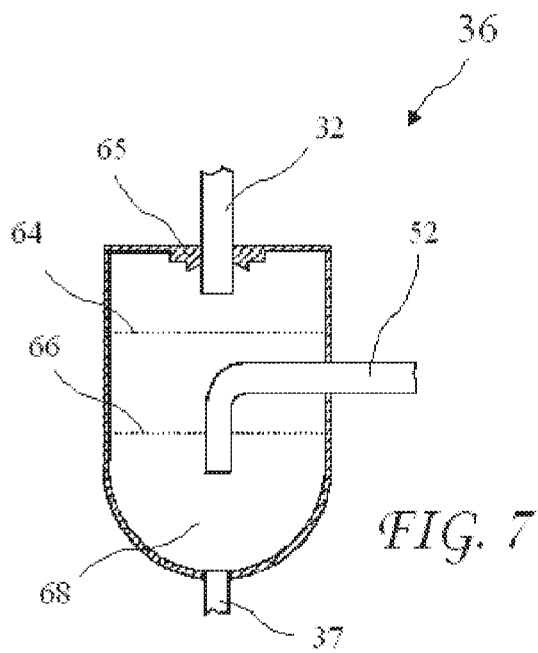
FIG. 7 is a cross-sectional view of the filter taken along line 7-7 of FIG. 6C.
Figure 6A:
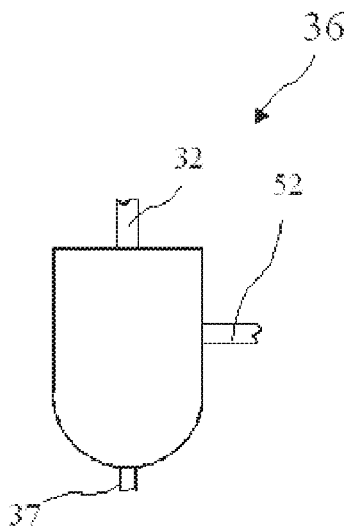
FIG. 6A is a side view of a suitable filter for filtering crankcase fumes according to the present invention.
Figure 6B:
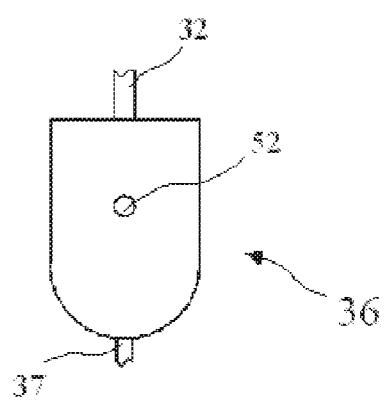
FIG. 6B is a front view of the filter.

A side view of an example of a suitable filter 36 according to the present invention is shown in FIG. 6A, a front view of the filter 36 is shown in FIG. 6B, and a top view of the filter 36 is shown in FIG. 6C. A cross-sectional view of the filter 36 taken along line 7-7 of FIG. 6C is shown in FIG. 7. The filter 36 includes an upper screen 64 and a lower screen 66. The hose 52 enters the filter 36 and turns down terminating below the lower screen 66. The hose 32 enters the top of the filter 36 and terminates above the upper screen 64. A bowl 68 is formed in the bottom of the filter 36 to catch liquids and to direct the liquids to the hose 37 at the lowest point of the bowl 68. A barrier 65 is formed around the exit point of the hose 32 from the filter 36 to facilitate liquids forming drops and failing into the bowl 68. The filter 36 thus catches liquids in the fume flow 34 to return the liquids to the crankcase.

Figure 8:
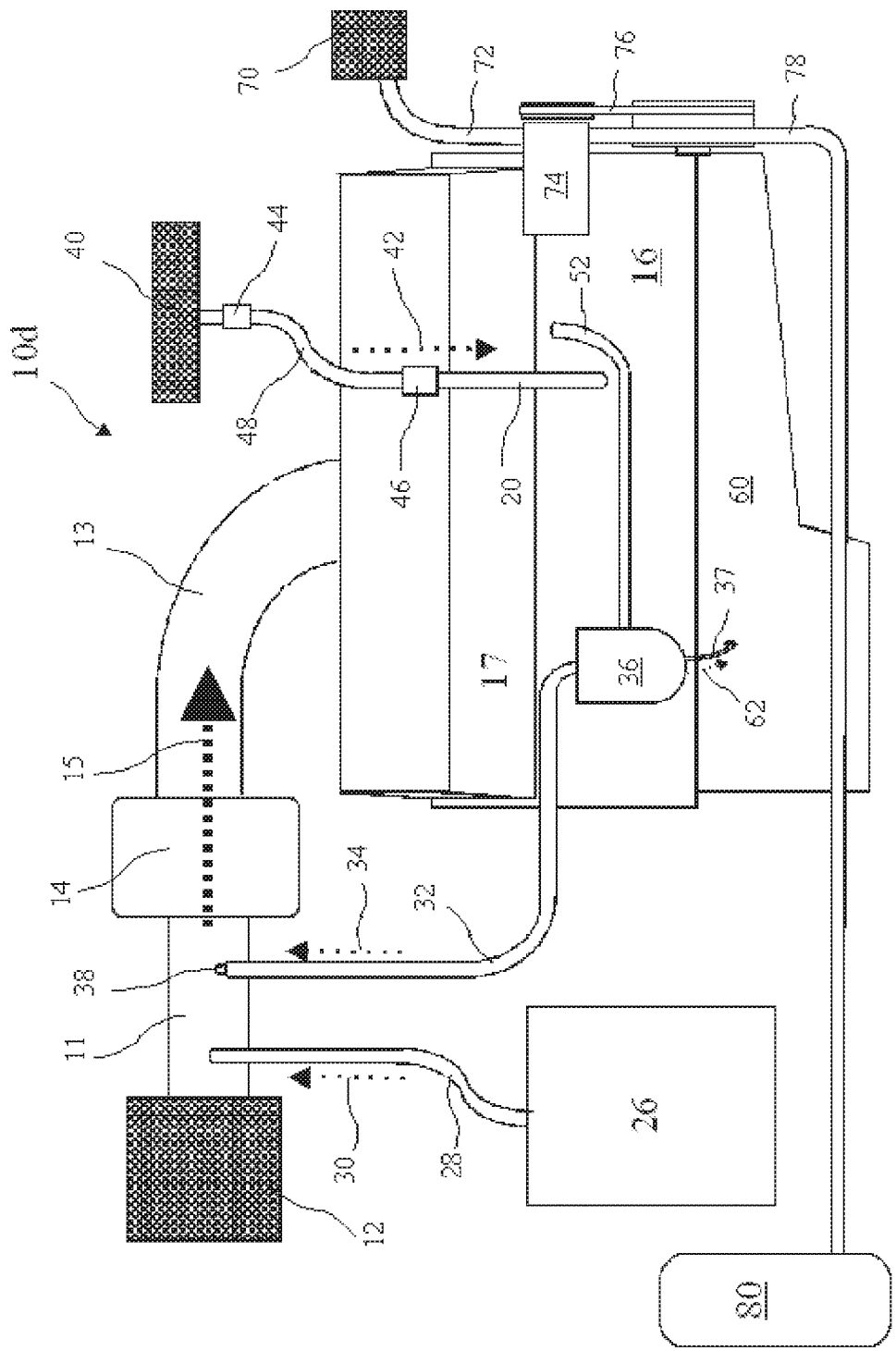
FIG. 8 is an engine with an auxiliary compressed air system having an independent air source.

A diesel engine 10*d* with an auxiliary compressed air system having an independent air source is shown in FIG. 8. In many heavy equipment applications, brakes etc. are operated using compressed air. Generally, the compressed air is supplied by an air compressor 74 and stored in a tank 80. Commonly, the air compressor is supplied with air from the air intake 11. The addition of hydrogen to the air intake 11 would thus result in hydrogen, and often oxygen, being compressed and stored, creating a risk of explosion. The diesel engine 10*d* provides an air filter 70 to independently provide filtered air to the compressor 74 to resolve this potential issue.

While the invention herein disclosed has been described by means of specific embodiments and applications thereof, numerous modifications and variations could be made thereto by those skilled in the art without departing from the scope of the invention set forth in the claims.

I claim:

1. A hydrogen augmented diesel engine comprising:
   a diesel engine including:
   an air intake for receiving an air flow for the engine;
   an intake manifold in fluid communication with the air intake for receiving the air flow and providing the air flow to the engine;
   an engine crankcase; and
   a hydrogen augmented crankcase ventilation system comprising:
   a hydrogen source producing a hydrogen flow including hydrogen gas;
   a hydrogen hose connecting the hydrogen source to one of the air intake and the intake manifold, the hydrogen hose carrying the hydrogen flow from the hydrogen source to the engine air intake;
   a breather hose in fluid communication with the engine crankcase for receiving a fumes flow from the crankcase;
   a filter connected to the breather hose at an end opposite the crankcase, the filter including a bowl for collecting liquids in the fumes flow;
   a drain line connected between the filter and the engine for draining the collected liquids into the engine;
   a fumes hose connecting the filter to the air intake, the fumes hose carrying the fumes flow from the filter to the air intake, such that the hydrogen flow and the fumes flow are combined together and joined with the air flow received by the diesel engine through the air intake.

2. The system of claim 1, wherein the hydrogen source is a hydrogen generator.

3. The system of claim 2, wherein:
   the hydrogen generator generates both the hydrogen gas and oxygen gas; and
   the hydrogen hose carries both hydrogen gas and oxygen gas to one of the air intake and the intake manifold.

4. The system of claim 1, wherein a supercharger fluidly resides between the air intake and the intake manifold.

5. The system of claim 4, wherein a turbocharger fluidly resides between the air intake and the intake manifold.

6. The system of claim 1, further including a clean air hose in fluid communication with the engine crankcase, the clean air hose carrying a clean air flow to the crankcase.

7. The system of claim 6, wherein the clean air hose includes an in-line back flow preventor.

8. The system of claim 6, wherein an air filter resides in fluid communication with the clean air hose opposite the crankcase and the air filter includes an in-line back flow preventor.

9. The system of claim 6, further including a vacuum regulator in fluid communication with to the clean air hose to regulate vacuum in the crankcase.

10. The system of claim 6, wherein the clean air hose connects to the crankcase through an oil fill tube.

11. The system of claim 1, wherein the filter includes a clear portion for viewing liquids collected by the in-line filter.

12. The system of claim 1, wherein the fumes flow is restricted to limit the flow rate of the fumes flow.

13. The system of claim 12, wherein the fumes flow is restricted to result in a crankcase vacuum between approximately one pound and approximately four pounds.

14. The system of claim 1, further including an orifice for regulating the fumes flow through the fumes hose from the crankcase to the air intake.

15. The system of claim 14, wherein the orifice resides proximal to where the fumes hose connects to the air intake.

16. The system of claim 1, wherein the hydrogen hose and the fumes hose connect to the engine air intake at spaced apart points.

17. The system of claim 1, further including a compressor and air tank for providing compressed air to vehicle systems, the compressor receiving clean air from outside the engine.

18. A diesel cycle engine including a hydrogen augmented crankcase ventilation system, comprising:
   a diesel cycle engine including:
   an engine block;
   at least one head attached to the engine block;
   an engine air cleaner;
   an air intake receiving air from the engine air cleaner;
   a supercharger receiving air from the air intake;
   an intake manifold receiving compressed air from the supercharger; and
   an engine crankcase inside the engine block containing at least one of a set of crankcase fumes consisting of blow-by and fumes resulting from the breakdown of engine oil;
   a hydrogen generator for generating hydrogen gas and oxygen gas;
   a hydrogen hose connecting the hydrogen generator to the air intake, the hydrogen hose for carrying the hydrogen gas and the oxygen gas from the hydrogen generator to the engine air intake;
   a fumes hose connecting the engine crankcase to the engine air intake, the fumes hose configured for carrying a fumes flow of crankcase fumes from the crankcase to the engine air intake, such that the hydrogen and fumes flows are combined together and joined with air received by the diesel cycle engine through the engine air intake;
   a filter connected in-line with the fumes hose for filtering the fumes flow and collecting liquid from the fumes flow;
   a drain line connected between the filter and the engine for draining the collected liquids back into the engine; and
   a clean air hose connecting a second air cleaner to the engine crankcase to provide a clean air flow to the crankcase.

19. A diesel cycle engine including a hydrogen augmented crankcase ventilation system, comprising:
   a diesel cycle engine including:
   an engine block;

at least one head attached to the engine block;
an engine air cleaner;
an air intake receiving air from the engine air cleaner;
a supercharger receiving air from the air intake;
an intake manifold receiving compressed air from the supercharger and carrying the compressed air to the at least one head; and
an engine crankcase inside the engine block containing crankcase fumes consisting of at least one of blow-by and fumes resulting from the breakdown of engine oil;
a hydrogen generator for generating hydrogen gas and oxygen gas;
a hydrogen hose connecting the hydrogen generator to the air intake, the hydrogen hose for carrying the hydrogen gas and the oxygen gas from the hydrogen generator to the engine air intake;
a fumes hose connecting the engine crankcase to the engine air intake, which fumes hose carries a fumes flow of crankcase fumes from the crankcase to the engine air intake, such that the hydrogen and fumes flows are combined together and joined with air received by the diesel cycle engine through the engine air intake;
a filter connected in-line with the fumes hose for filtering the fumes flow and collecting liquid from the fumes flow;
a drain line connected between the filter and the engine for draining the collected liquids back into the engine; and
a clean air hose connecting a second air cleaner to the engine crankcase to provide a clean air of clean air to the crankcase.

* * * * *